United States Patent [19]

Leutner

[11] 4,172,931

[45] Oct. 30, 1979

[54] WELDING OF MEMBRANES OF FLUORINATED POLYMERS

[75] Inventor: Bernd Leutner, Frankenthal, Fed. Rep. of Germany

[73] Assignee: BASF Aktiengesellschaft, Fed. Rep. of Germany

[21] Appl. No.: 851,782

[22] Filed: Nov. 15, 1977

[30] Foreign Application Priority Data

Dec. 6, 1976 [DE] Fed. Rep. of Germany ....... 2655145

[51] Int. Cl.² .......................... B29D 23/10; B32B 7/04
[52] U.S. Cl. .................................... 525/355; 156/306; 525/374
[58] Field of Search ................. 260/79.3 R, 79.3 MU; 156/306; 526/42

[56] References Cited

U.S. PATENT DOCUMENTS

| 3,784,399 | 1/1974 | Grot | 260/79.3 R |
| 3,884,885 | 5/1975 | Grot | 260/79.3 R |
| 4,025,375 | 5/1977 | Leasure | 156/306 |
| 4,063,977 | 12/1977 | Groby | 156/306 |
| 4,076,571 | 2/1978 | Specht et al. | 260/79.3 MU |

*Primary Examiner*—Ronald W. Griffin
*Attorney, Agent, or Firm*—Keil & Witherspoon

[57] ABSTRACT

A process for welding membranes of fluorinated polymers which contain groups with exchangeable H-ions. To carry out the process, the polymer in at least one of the membranes to be welded together must be in the H-form.

8 Claims, No Drawings

WELDING OF MEMBRANES OF FLUORINATED POLYMERS

The present invention relates to a process for welding membranes of fluorinated polymers which contain groups with exchangeable H-ions.

Fluorinated polymers containing the acid groups —$SO_3H$, —$COOH$ or —$PO_3H_2$ in the polymer chain are employed, because of their excellent chemical resistance and their ion exchange properties, in place of other cation exchangers, mostly based on styrenedivinylbenzene, where the latter are insufficiently resistant to chemicals and/or heat.

Membranes of fluorinated cation exchangers have found a new use in chlor-alkali cells. The use of such chlorine-resistant and alkali-resistant conductive cation exchange membranes makes it possible to replace the asbestos diaphragms used in conventional diaphragm cells for the manufacture of chlorine and sodium hydroxide solution from sodium chloride solution.

The membranes employed for electrolysis in membrane cells are very thin in order to keep the electrical resistance low. Hence, a particular embodiment of the cation exchange membranes comprises from about 0.1 to 0.3 mm thick membranes or films which are frequently reinforced mechanically by means of an embedded fabric.

In the course of using the fluorinated cation exchange membranes, cracks or small, pinhead-fine holes or other sources of leakage may form in the membrane. Such damaged membranes can no longer be used for chlor-alkali electrolysis, since the cathode chamber is no longer sealed against penetration of NaCl solution. It is therefore desirable to be able to repair damaged membranes by welding intact pieces of membrane over the leaks.

U.S. Pat. No. 3,884,885 discloses a process for welding fluorinated cation exchange membranes after a special pretreatment. The latter is carried out by replacing the hydrogen ions or metal ions of the membrane by bulky organic tertiary or quaternary ammonium ions. Membranes treated in this way, for example with tetrabutylammonium hydroxide, can then be welded to one another at from 230° to 240° C. under a pressure of 26 kp/cm². Before the membranes are re-used for electrolysis, the organic ammonium group must again be replaced by H⁺ or a metal ion. This repeated treatment with special organic ammonium bases is involved and time-consuming. Furthermore, decomposition may occur during welding, because of the lower heat stability of the ammonium bases. Gas bubbles can easily become included in the welds.

It is an object of the present invention to provide a process for welding membranes of fluoride polymers, which does not suffer from the disadvantages of conventional processes.

I have found that this object is achieved by an improved process for welding membranes of fluorinated polymers, which contain groups with exchangeable H-ions, wherein at least one of the membranes to be welded is in the H-form and the welding is carried out at from 200° to 350° C. in a press under a pressure of from 1 to 100 bars.

For the purposes of the invention, the fluorinated polymers of which the membranes consist are polymers with a fluorocarbon chain, which in addition contain groups wherein the cations can be replaced by H-ions. These groups can be directly bonded to the fluorocarbon main chain of the polymer but can also be bonded to a side chain. Examples of groups in which the cations can be replaced by H-ions are —$SO_3X$, —$COOX$ and —$PO_3X$, where X is an alkali metal, eg. sodium or potassium, but can, in the exchanged form, also be H. Alternatively, the exchageable groups can be —$SO_2NR^1R^2$, where $R^1$ is hydrogen, sodium or potassium and $R^2$ is alkyl. The use of such polymers as membranes for electrolyses is described, for example, in U.S. Pat. Nos. 3,884,885, 3,784,399 and 3,770,567, and German Laid-Open Applications DOS Nos. 2,437,395, 2,447,540, 2,446,194 and 2,558,393.

The thickness of the films used as membranes for electrolysis is mostly from 10 to 2,000 μm, especially from 100 to 300 μm.

For welding, the polymer of at least one of the membranes to be welded together should predominantly be in the H-form, ie. from 50 to 100% of the exchangeable groups should be in this form. The term H-form is applied to the form of the exchangeable groups in which the cation is a hydrogen ion. Further details may be found in the book "Ionenaustauscher" by K. Dorfner, 3rd edition, published by Walter de Gruyter & Co., Berlin, 1970, particularly pages 47 et seq.

To convert the membranes of fluorinated polymers, as used, for example, in electrolytic cells, into the H-form, to enable them to be welded, the membranes are treated with a mineral acid, eg. with 10% strength hydrochloric acid or nitric acid, at from room temperature to the boiling point of the acid, for from 0.1 to 20 hours. They are then washed and dried. They can be welded in the air-dried condition. In the case of fairly small welds, of a few cm² in area, simply wiping off the wash water adhering to the surface of the membranes is a completely sufficient drying treatment. Welding is carried out at from 200° to 350° C., preferably from 230° to 280° C. The welding pressure is from 1 to 100, preferably from 1.5 to 20, bars.

To carry out the weldheated in a press to the required temperature, under the pressure to be employed. It is then cooled under pressure, after which it is released from the press. However, cooling under pressure can be omitted, without any disadvantage.

According to the invention, at least one of the membranes to be welded together should be in the H-form. For example, the membranes to be repaired can be charged with alkali metal ions and only the piece of membrane used for the repair need be in the H-form. It is, however, also possible, and advantageous, to have both of the membranes to be welded together in the H-form.

EXAMPLE 1

A cation exchange membrane, which consists of a 125 μm thick homogeneous film of a copolymer of tetrafluoroethylene and perfluoro(3,5-dioxa-4-methyl-7-octenesulfonylfluoride) in which the sulfonylfluoride groups have been converted to sulfonic acid groups, having an equivalent weight of 1,200 (g of polymer/equivalent of sulfonic acid) and which is reinforced with a polytetrafluoroethylene fabric of about 18 meshes per cm, was welded. The thickness of the threads of the fabric is from 250 to 350 μm. Such membranes are described, for example, in U.S. Pat. No. 3,884,885, Example 1.

Before welding a 10 cm long crack in the membrane, which is 1.25 m² in size, the membrane, which is in the Na+-form, and a covering piece of the same material, of size 15×15 cm, were left in 10% strength hydrochloric acid at 23° C. for 12 hours to convert the material to the acid form. After thorough rinsing with distilled water and drying in air at room temperature, the smaller membrane was placed over the crack and welded in a press with electrically heated, temperature-regulated plungers at from 250° to 255° C. under a pressure of 10 bars for five minutes.

To avoid sticking to the plungers, the surfaces of the membrane in the press were each covered with a 50 μm thick polytetrafluoroethylene film. Each of these was backed by a 2 mm thick silicone rubber sheet which withstands temperatures of up to 300° C. The rubber sheet served to ensure better pressure distribution.

The weld showed no included gas bubbles whatsoever. It exhibited no leaks even after 7 days' electrolysis with NaCl as the anolyte.

EXAMPLES 2 AND 3

The preparation of the membranes, and the sandwich arrangement in the press, were the same as in Example 1. Small holes which had formed and were of the size of one mesh width of the membrane are covered with circular patches of the same material, of diameter 2 cm. In Example 2, the patches consisted of a polymer in the H+-form whilst in Example 3 they were in the Na+-form. The base membrane was in the H-form. The most advantageous welding conditions were:

| Patches in the | | Temp. ° C. | Pressure bars | Time min |
|---|---|---|---|---|
| Example 2 | H+-form | 240 | 2-3 | 5 |
|  |  | 260 | 2-3 | 3 |
| Example 3 | Na+-form | 280 | 1.6 | 5 |

The welded-on patches continued to adhere firmly to the base even after 17 hours' boiling in saturated NaCl solution.

An attempt was made to weld together pairs of membranes, each in the Na+-form, under identical conditions to those described in Examples 2 and 3. No welding occurred. The applied patches were easily pulled off the membrane base.

EXAMPLE 4

Welding was carried out with an 0.25 mm thick, clear, nonreinforced membrane of a perfluorinated sulfonic acid polymer. Its chemical structure is the same as that of the membrane described in Example 1. The preparations for welding were as described in Example 2. The optimum welding conditions were found to be 260° C., a pressure of 2 bars and a time of 5 minutes.

I claim:

1. A process for welding together membranes of fluorinated polymers containing exchangeable cations which comprises treating a membrane to be welded with a mineral acid to convert the exchangeable cations predominantly to the H-form, and heating the membranes to be welded to a temperature of from about 200° to 350° C. in a press under a pressure of from 1 to 100 bars.

2. A process as set forth in claim 1, wherein the fluorinated polymers contain sulfonic acid groups.

3. A process as set forth in claim 1, wherein the welding is carried out at from 230° to 280° C. in a press under a pressure of from 1.5 to 20 bars.

4. A process as set forth in claim 1 wherein the exchangeable cations are selected from the group consisting of —$SO_3X$, —COOX or $PO_3X$, wherein X is an alkali metal.

5. A process as set forth in claim 1, wherein the polymer in the H-form has from 50 to 100% of the exchangeable groups in this form.

6. A process as set forth in claim 1, wherein the membranes are from 10 to 2,000 μm thick.

7. A process as set forth in claim 1, wherein the polymers are converted to the H-form by treatment with hydrochloric acid or nitric acid at a temperature of from room temperature to the boiling point of the acid for from 0.1 to 20 hours.

8. A process as set forth in claim 7, wherein the membrane after treatment with acid is washed and air dried.

* * * * *